(No Model.)
H. L. RICE.
Miners' Scraper.
No. 239,547. Patented March 29, 1881.
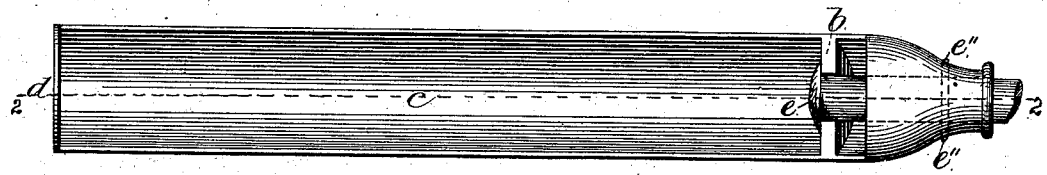
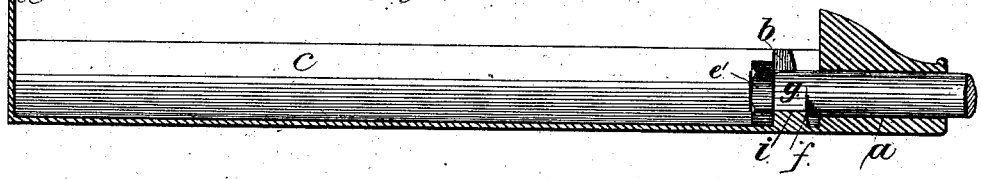
Witnesses:
Francis J. J. Quirk
Richard H. Lacey
Inventor:
Hugh Louis Rice
N. PETERS, PHOTO-LITHOGRAPHER, WASHINGTON, D. C.

UNITED STATES PATENT OFFICE.

HUGH L. RICE, OF FAIR PLAY, COLORADO.

MINER'S SCRAPER.

SPECIFICATION forming part of Letters Patent No. 239,547, dated March 29, 1881.

Application filed October 5, 1880. (No model.)

*To all whom it may concern:*

Be it known that I, HUGH LOUIS RICE, a citizen of the United States, residing at Fair Play, in the county of Park and State of Colorado, have invented an Improved Miner's Scraper, of which the following is a specification.

My improvement relates to scrapers for removing drillings or borings from drilled or bored holes.

My invention consists in a scraper constructed with a trough, a socket for a suitable handle, a bridge for holding the inner end of said handle, and a lip for retaining the scrapings.

My invention consists, further, in the means employed for connecting the handle to the scraper.

In order that my invention may be fully understood, I will proceed to describe it with reference to the accompanying drawings, in which—

Figure 1 is a top or plan view of my improved scraper. Fig. 2 is a vertical longitudinal section thereof on the line 2 2, Fig. 1.

$a$ is a socket for the reception of a suitable handle, $h$, secured by a bridge, $b$, and headed or riveted, as at $e$, at the inner end.

$c$ is the trough which receives the borings to be withdrawn or the powder to be inserted, and is formed with a lip, $d$, at its inner end, for retaining the contents.

Instead of riveting, the inner end of the handle can be secured by a nut, $e'$.

$f$ is one of the shoulders formed by cutting away the shank $g$ of the handle to fit the square seat $i$ in the bridge $b$, and prevents the handle from being inserted too far. The flat sides of the shank fitting the square seat in the bridge, the handle is kept from turning.

The scraper can be made of malleable iron, at small cost, and either a long or short handle can be readily applied thereto. $e''$ is a pin or bolt for securing the handle to the socket.

Having thus described my invention, the following is what I claim as new and desire to secure by Letters Patent:

1. The miner's scraper constructed with socket $a$, bridge $b$, trough $c$, and lipped end $d$, as set forth.

2. The combination of trough $c$, bridge $b$, square seat $i$, handle $h$, square shank $g$, and securing device $e$, as set forth.

HUGH LOUIS RICE.

Witnesses:
FRANCIS J. J. QUIRK,
RICHARD H. LACEY.